(12) United States Patent
Sundararajan

(10) Patent No.: US 12,435,797 B2
(45) Date of Patent: Oct. 7, 2025

(54) GATE VALVE WITH SEAT ASSEMBLY

(71) Applicant: SRI Energy Inc., Sugar Land, TX (US)

(72) Inventor: Alagarsamy Sundararajan, Katy, TX (US)

(73) Assignee: SRI Energy Inc., Sugar Land, TX (US)

( * ) Notice: Subject to any disclaimer, the term of this patent is extended or adjusted under 35 U.S.C. 154(b) by 0 days.

(21) Appl. No.: 18/312,074

(22) Filed: May 4, 2023

(65) Prior Publication Data

US 2023/0272860 A1 Aug. 31, 2023

Related U.S. Application Data

(63) Continuation of application No. 17/475,400, filed on Sep. 15, 2021, now Pat. No. 11,644,105, which is a continuation of application No. 16/240,528, filed on Jan. 4, 2019, now Pat. No. 11,125,341, which is a continuation of application No. 15/276,113, filed on Sep. 26, 2016, now Pat. No. 10,174,848, which is a continuation of application No. 14/311,419, filed on Jun. 23, 2014, now Pat. No. 9,453,578.

(60) Provisional application No. 61/843,701, filed on Jul. 8, 2013.

(51) Int. Cl.
*F16K 3/02* (2006.01)
*F16K 3/20* (2006.01)

(52) U.S. Cl.
CPC ............. *F16K 3/0236* (2013.01); *F16K 3/20* (2013.01); *F16K 3/207* (2013.01)

(58) Field of Classification Search
CPC ..... F16K 1/42; F16K 1/46; F16K 3/02; F16K 3/0236; F16K 3/0227; F16K 3/0272; F16K 3/0281; F16K 25/005

USPC ................ 251/174, 186, 195, 197, 326–329, 251/360–363
See application file for complete search history.

(56) References Cited

U.S. PATENT DOCUMENTS 1,708,851 A 4/1929 Sparks
1,752,657 A 4/1930 Sparks
2,230,600 A 2/1941 Olson
(Continued)

FOREIGN PATENT DOCUMENTS

GB 221401 A 9/1924

OTHER PUBLICATIONS

European Patent Office, Communication pursuant to Article 94(3) EPC mailed Jul. 6, 2018 in European Patent Application No. 14822690.5, seven pages.
(Continued)

*Primary Examiner* — Michael R Reid
(74) *Attorney, Agent, or Firm* — Trop, Pruner & Hu, P.C.

(57) ABSTRACT

The present invention provides a gate valve assembly having a valve body with a channel extending from a distal end to a proximal end, a gate configured to be moved from a first position to a second position, the second position being when the gate is positioned in the channel of the valve body between the distal end and the proximal end of the valve body. A seat insert is also provided to be threaded into a pocked of the valve body and a seat is configured to be positioned within the seat insert. A seal is adapted within a groove of the seat insert positioned between the valve body and the seat insert, wherein the seal is a fixed static seal providing no gaps and/or spaces between the seal insert and the valve body allowing no debris to corrupt the seals.

20 Claims, 5 Drawing Sheets

(56) References Cited

U.S. PATENT DOCUMENTS

| | | | |
|---|---|---|---|
| 2,796,230 | A | 6/1957 | Grove et al. |
| 2,815,187 | A | 12/1957 | Hamer |
| 2,985,422 | A | 5/1961 | Anderson et al. |
| 3,222,028 | A | 12/1965 | Grove |
| 4,124,194 | A | 11/1978 | Alvarez et al. |
| 4,188,016 | A | 2/1980 | Whaley |
| 4,513,947 | A | 4/1985 | Amend |
| 4,625,942 | A | 12/1986 | Nelson |
| 4,878,651 | A | 11/1989 | Meyer, Jr. |
| 5,029,812 | A | 7/1991 | Haynes |
| 5,163,655 | A | 11/1992 | Chickering, III et al. |
| 5,320,327 | A | 6/1994 | Beson |
| 6,575,426 | B2 | 6/2003 | Sundararajan |
| 6,601,650 | B2 | 8/2003 | Sundararajan |
| 6,609,533 | B2 | 8/2003 | Sundararajan |
| 6,664,572 | B2 * | 12/2003 | Chatufale ............... F16K 3/207 251/329 |
| 6,684,897 | B2 | 2/2004 | Sundararajan |
| 6,966,537 | B2 | 11/2005 | Sundararajan |
| 7,004,452 | B2 | 2/2006 | Chatufale |
| 7,040,408 | B2 | 5/2006 | Sundararajan et al. |
| 7,578,349 | B2 | 8/2009 | Sundararajan et al. |
| 8,205,890 | B2 | 6/2012 | Sundararajan |
| 8,714,263 | B2 | 5/2014 | Sundararajan et al. |
| 9,453,578 | B2 * | 9/2016 | Sundararajan ........ F16K 3/0236 |
| 10,174,848 | B2 | 1/2019 | Sundararajan |
| 11,125,341 | B2 * | 9/2021 | Sundararajan .......... F16K 3/207 |
| 11,644,105 | B2 * | 5/2023 | Sundararajan ........ F16K 3/0236 251/328 |
| 2003/0015681 | A1 | 1/2003 | Chatufale |
| 2004/0178381 | A1 | 9/2004 | Sundararajan |
| 2006/0017035 | A1 | 1/2006 | Bearer et al. |
| 2012/0085957 | A1 | 4/2012 | Dhawan et al. |
| 2015/0014568 | A1 | 1/2015 | Sundararajan |

OTHER PUBLICATIONS

European Patent Office, Office Action mailed Feb. 20, 2017 in European Patent Application No. 14822690.5, 8 pages.
European Patent Office, Intention to Grant mailed Mar. 30, 2021 in European Patent Application No. 20150613.6 (6 pages).
European Patent Office, Communication pursuant to Article 94(3) issued in corresponding European Patent Application No. 14822690.5, dated Oct. 12, 2017 (7 pages).
European Patent Office, "Intention to Grant" issued in corresponding European Patent Application No. 20150613.6, dated Jun. 21, 2021 (6 pages).
"Everything You Need to Know about Static Seals", AZO Materials, Oct. 21, 2016, five pages.
European Patent Office, European Search Report mailed Apr. 14, 2020 in European Patent Application No. 20150613.6 (9 pages).
European Patent Office, "Communication," Extended European search report mailed Mar. 2, 2016 in European application No. 14822690.
International Searching Authority, "Notification of Transmittal of the International Search Report and the Written Opinion of the International Searching Authority," mailed Oct. 22, 2014 in International application No. PCT/US2014/045692.
European Patent Office, Office Action mailed Jan. 10, 2022 in European Patent Application No. 21212915.9 (9 pages).
European Patent Office, Communication Pursuant to Article 94(3) EPC dated Feb. 16, 2023 in European Patent Application No. 21212915.9 (6 pages).
European Patent Office, Communication Pursuant to Article 94(3) EPC dated Feb. 22, 2024 in European Patent Application No. 21212915.9 (5 pages).
European Patent Office, Communication Under Rule 71(3) EPC dated Nov. 15, 2024 in European Patent Application No. 21212915.9 (24 pages).

* cited by examiner

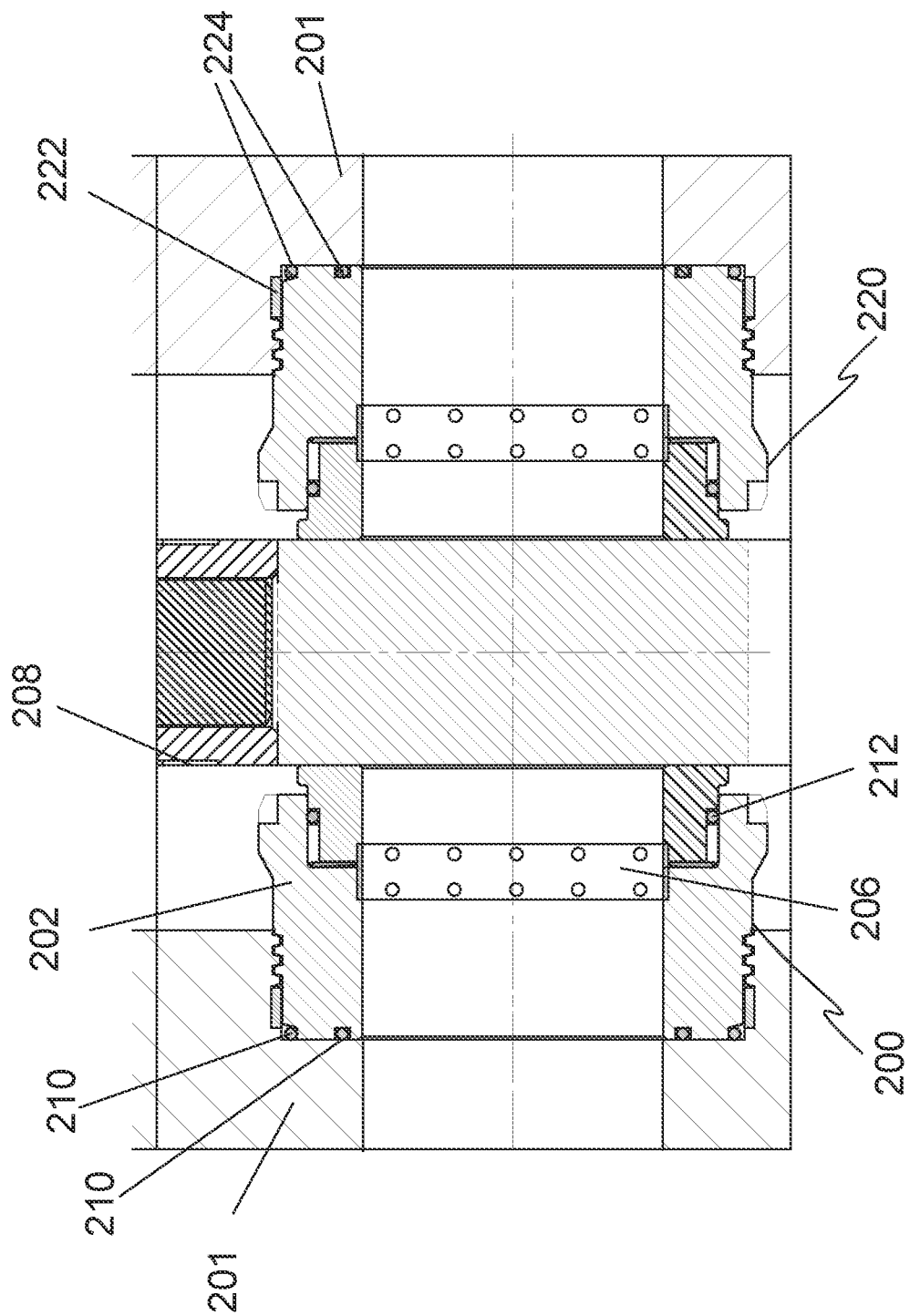

GATE VALVE WITH SEAT ASSEMBLY

CROSS-REFERENCE TO RELATED APPLICATIONS

This application is a continuation of U.S. patent application Ser. No. 17/475,400, filed Sep. 15, 2021 and entitled "Gate Valve With Seat Assembly", which is a continuation of U.S. patent application Ser. No. 16/240,528, filed Jan. 4, 2019, now United Patent No. 11,125,341, issued Sep. 21, 2021 and entitled "Gate Valve With Seat Assembly", which is a continuation of U.S. patent application Ser. No. 15/276,113, filed Sep. 26, 2016, now U.S. Pat. No. 10,174,848, issued Jan. 8, 2019 and entitled "Gate Valve With Seat Assembly", which is a continuation of U.S. patent application Ser. No. 14/311,419, filed Jun. 23, 2014, now U.S. Pat. No. 9,453,578, issued Sep. 27, 2016 and entitled "Gate Valve with Seat Assembly", which claims priority to U.S. Provisional Patent Application Ser. No. 61/843,701 filed on Jul. 8, 2013 and entitled "Gate Valve With Seat Assembly and Method". The content of each of the above applications is hereby incorporated by reference.

FIELD OF THE INVENTION

The present disclosure generally relates to gate valves and in particular to an improved seat assembly.

BACKGROUND

Gate valves that are used in the oil and gas industry typically have a body with a flow passage extending through it. The flow passage intersects a central cavity. A gate is provided to move through the central cavity to block the flow passage. Seal rings are used to bridge a gap between the valve body and the gate to prevent fluid from flowing around the gate when the gate blocks the flow passage. There is a need for an improved seat assembly to prevent leaks in the valve.

SUMMARY

A gate valve assembly is provided in one exemplary embodiment. The assembly provides a valve body having an opening, a seat insert configured to be threaded it to the opening of the valve body, and a seat configured to be positioned within the seat insert.

The features and advantages of the present invention will be readily apparent to those skilled in the art. While numerous changes may be made by those skilled in the art, such changes are within the spirit of the invention.

BRIEF DESCRIPTION OF THE DRAWINGS

To further clarify the features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings in which:

FIG. 5 illustrates another view of the gate valve assembly according the present invention.

DETAILED DESCRIPTION OF THE ILLUSTRATED EMBODIMENTS

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
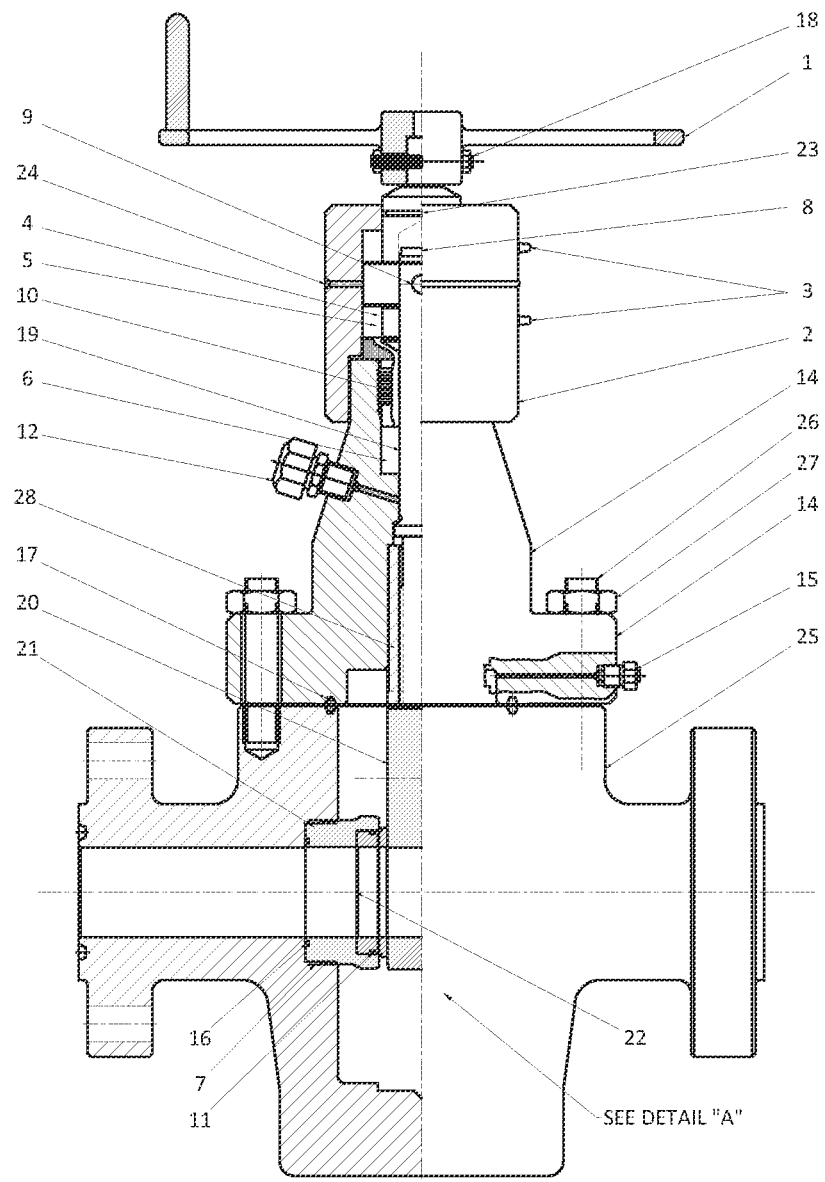
FIG. 1 illustrates a gate valve assembly in accordance with one embodiment of the present invention.

FIG. 1 illustrates an improved gate valve assembly. The gate valve assembly is provided with a hand wheel 1, a packing stem 6, a bonnet 14, operating stem 19, a gate 20, a valve body 25, and a gate valve seating assembly 100. In operation, the gate valve assembly 100 is configured so that as the hand wheel 1 is actuated, the operating stem 19 is moved so that the gate 20 can either close or open the channel in the valve body 25. When the gate 20 is in an open position, fluid is allowed to flow through the channel in the valve body 25. When the gate is in a closed position, the flow of fluid is disrupted within the channel. A gate valve seating assembly 100 is provided between the valve body 25 and the gate 20 so that leakage of fluid from the channel when the gate is closed may be prevented. In the preferred embodiment, a two-way gate valve assembly is provided such that either the upstream line and the downstream line can be attached to either side of the valve body.

Bonnet 14 is mounted to the valve body 25 by studs 16 and secured with hex nuts 27. The bonnet 14 is sealed with respect to the valve body 25 by bonnet gaskets 17. Packing stein 6 provides a seal between the bonnet 14 and the operating stem 19. The seal assemblies between the valve body 25 and the gate valve are described in greater detail with reference to FIGS. 2-5. Attached to the bonnet 14 are also autoclave fittings 12 and 15. Autoclave fitting 15 is a bleed port or a pressure release valve which allows an operator to release pressure with respect to the valve body and the gasket. Autoclave fitting 12 is a grease port fitting which allows an operator to introduce a lubricant between the bonnet 14 and the gate 20.

Figure 2:
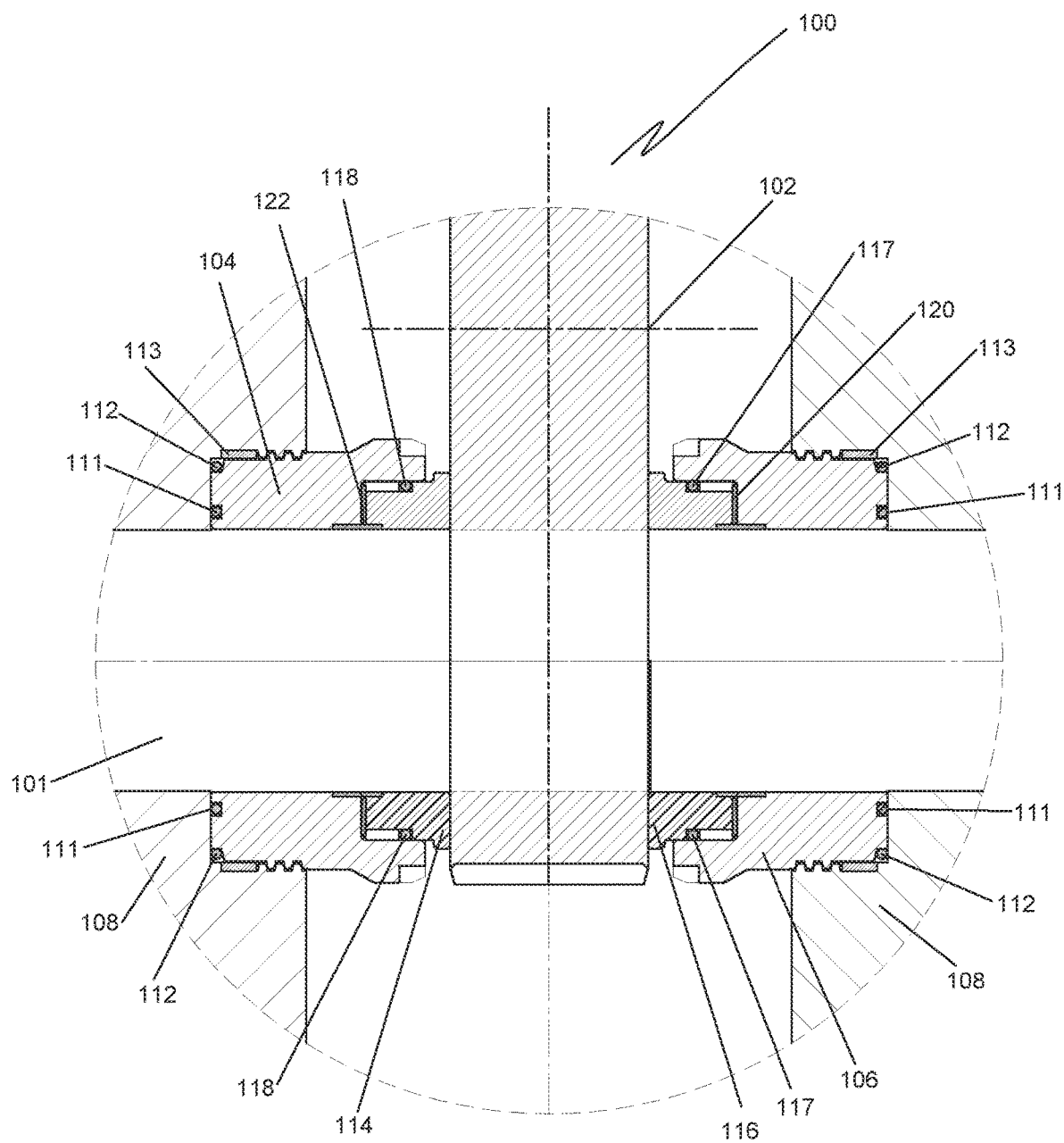
FIG. 2 illustrates a seat assembly in accordance with the embodiment illustrated in FIG. 1 of the present invention.
Figure 3:
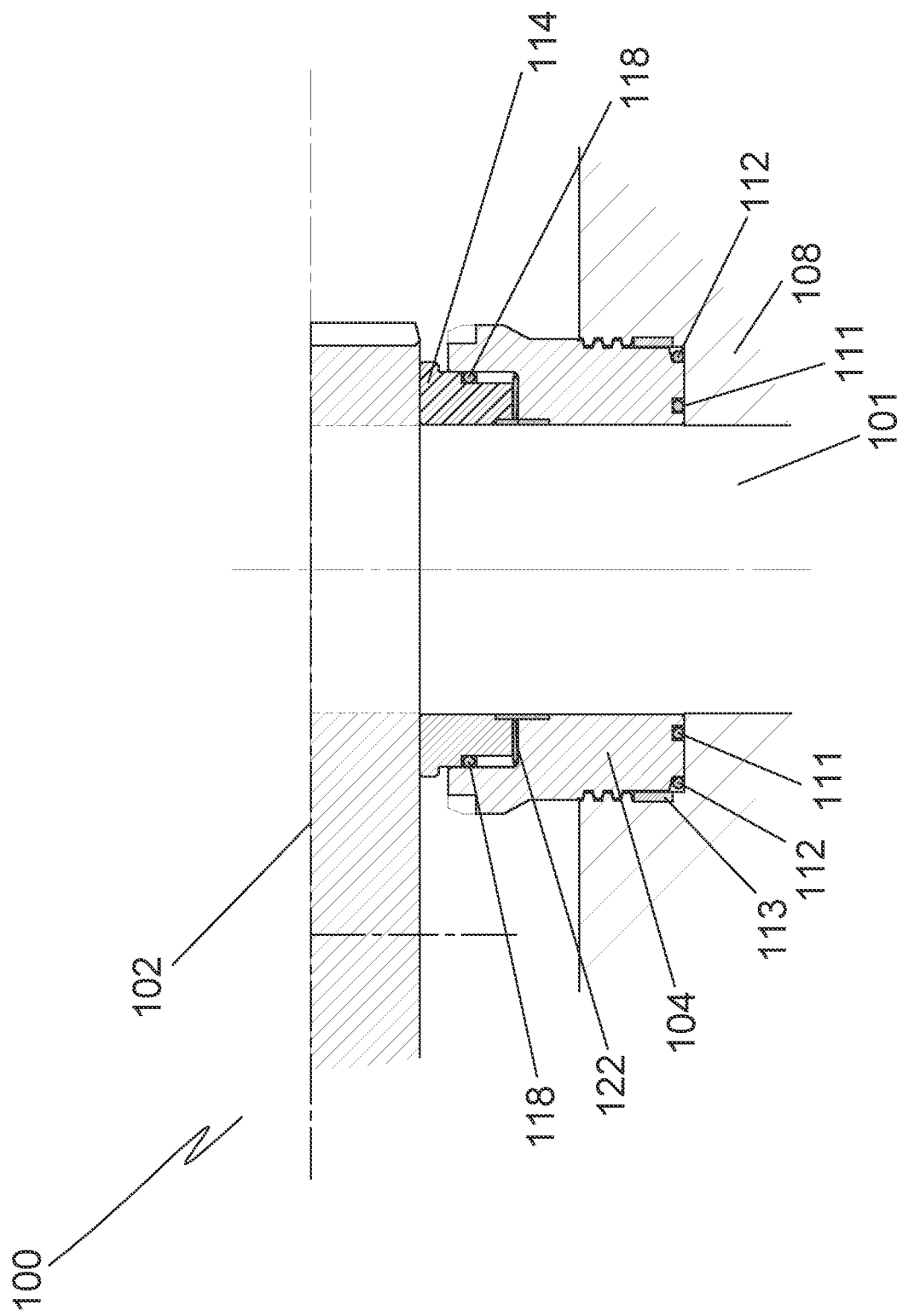
FIG. 3 illustrates a seat assembly positioned on one side of a gate valve assembly in accordance with one embodiment of the present invention.

Now turning to FIGS. 2 and 3, an exploded view of an improved gate valve seat assembly 100 in a preferred embodiment of the present invention is provided. Seating assemblies are positioned as to surround channel 101 and are preferably circular in construction and preferably mount into cylindrical shaped pockets. The gate valve assembly 100 is illustrated in greater detail. The gate valve assembly 100 comprises a gate 102 which is used to control the flow through the flow bore channel 101 when the gate 102 is actuated. The assembly 100 also includes first and second seat inserts 104, 106 on opposing sides of the gate 102. The first and second seat inserts 104 and 106 are threaded into the valve body 108. It should be noted that the first and second seat inserts 104 and 106 may be coupled to the valve body 108 by any mechanical methods such as press fittings or any other mechanical means. In the preferred embodiment the seat inserts 104 and 106 are threaded into the valve body. The threads are configured so that the seat inserts may not unthread without an operator.

Annular seals 111 and 112 are positioned between the seat inserts 104 and 106 and the valve body 110. These seals 111, 112 may be O-rings and/or spring energized type seals. Any other type of mechanically viable seal may also be used. The seals 111, 112 may be composed of polymer, elastomeric, non-elastomeric, and/or metallic material or some combination thereof and are configured to be suitable to any application depending on the variability of environmental factors such as flow pressure (low/high) and temperature.

The seals 111, 112 are further adapted to be positioned within a groove of the seat inserts 104 and 106. The seat inserts 104 and 106 are further configured to receive and accommodate seats 114 and 116 in a counter bore channel with seals 117 and 118 on the outside diameter of the seats 114 and 116. Springs 120 and 122 are also provided which are positioned between each of the seat inserts 104 and 106 and the back face of each one of the seats 114 and 116.

Springs 120 and 122 may include several components, spacers, bushings, rings, and the like as desired to provide an initial seal force. Springs 120 and 122 are preferably circular and surrounds channel 101. In the preferred embodiment, a metallic ring seal 113 is used to provide additional protection against any debris that may enter the space between the seat insert and valve body. This allows protection of the space between the valve body and the seat insert as well as providing protection for the seals 111 and 112.

The arrangement of the seals and the seat inserts 104, 106 enable a static seal between the valve body pocket and the fixed seat inserts 104 and 106. The static seals 111-113 provide the benefit of allowing no gaps and/or spaces between the seat inserts 104 and 106 and the valve body 108, thereby allowing no debris or solids to corrupt the seals 111-113 which are positioned in a groove within the seat inserts 104 and 106. The fixed seat inserts 104 and 106 and the seats 114 and 116 are configured so that they are in continuous contact with the surface of the gate 102 through the spring force provided by the springs 120 and 122. Since the seats 114 and 116 are in continuous contact with the gate surface, a very limited dynamic action of the seat seals 117 and 118 are provided.

The above arrangement of the components of the valve assembly 100 provides that the pressure from the flow bore channel 101 effectively seals all the passages by seals 111-113 and seals 117 and 118. They also allow for continuous contact between the seats 114 and 116 and the gate 102 by the use of spring 120, thereby allowing for sealing at maximum designed working pressures including of the valve and in low pressures as required. The seat inserts 104 and 106 being fixed into the valve body 114) (pressure containing element) provides the additional benefit of protection from erosion and corrosion caused by debris and other unwanted solids which cannot enter into the space between the seat inserts 104 and 106 and the valve body 108. As a result of using fixed seat inserts, the seals become static as provided in the preferred embodiment, the valve body assembly benefits with a longer life span compared to using dynamic seals and non-fixed seat inserts.

The surfaces of the seats 114 and 116 are adapted to be able to seal gate 102. The surfaces may be provided with various indentations or a finished surface having a surface area that may be larger or smaller than other surface areas of the seating assembly to effect a variable force acting against the gate so that the sealing force that pushes the surfaces is greater than the force that would urge the two surfaces apart.

Figure 4:
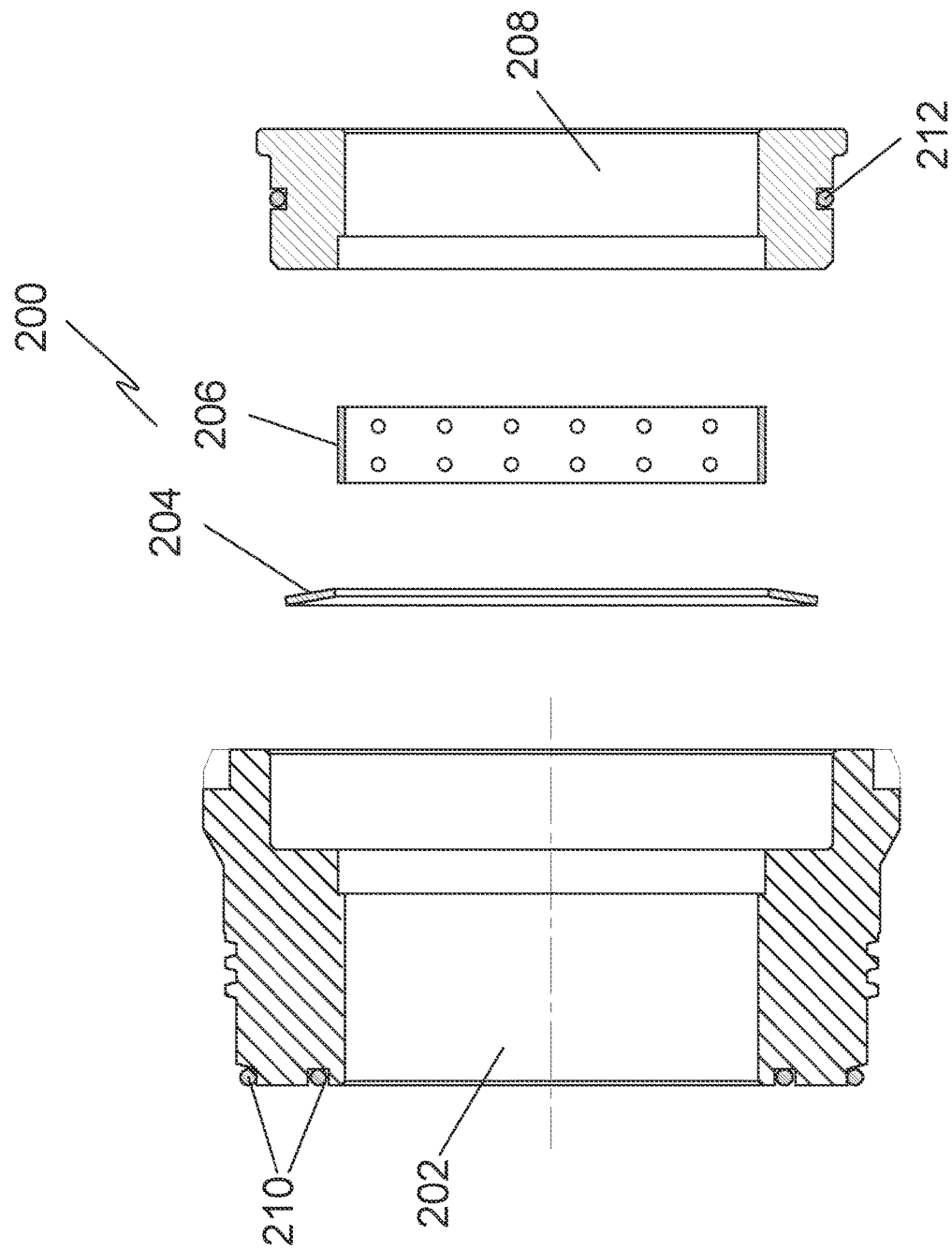
FIG. 4 illustrates an exploded view of a seat assembly according to the present invention.

FIG. 4 illustrates an exploded view of the seat assembly 200. The seat assembly 200 includes a seat retainer 202, a disc spring 204 positioned within a groove of the seat retainer 202, a trash ring 206 positioned within the seat retainer 202. A seat assembly 200 also includes a seat that is configured to with within the groove of the seat retainer 202. That assembly 200 further includes high pressure/high temperature seals 210 positioned between the seat retainer 202 and the valve body. The seat 20 is also provided with at least one high pressure/high temperature seal 212.

FIG. 5 illustrates the seat assemblies 200 and 220 positioned within a valve body when the gate is in a closed position. As illustrated in FIG. 5, seat assemblies 200 and 220 are positioned on the both the upstream and downstream portions of the valve body. As a result, the seating mechanism used in the seat assemblies provides improved sealing on both the upstream and downstream of the valve body. The seat retainers 202 and 222 are threaded into the valve body 201. High pressure/High temperature seals 210 and 224 are positioned between the seat retainers 202 and 222 and the valve body 201. Although high pressure/high temperature seals are used in this embodiment, any type of seal may be used.

During operation of the gate valve, the fluid enters into the channel and the valve body pressure is automatically de-energized to the downstream pressure and this is achieved by the valve body pressure which moves the seat toward the seat insert by pushing the spring creating a gap between the gate and the seat. As a result, the valve body pressure is drained to equal to the lowest pressure of the sides.

Thus, an embodiment includes a gate valve assembly, some of which is shown in the embodiment of FIG. 3. The assembly includes a valve body having a channel extending from a distal channel portion at a distal end of the valve body to a proximal channel portion at a proximal end of the valve body. The assembly includes a gate 101 configured to move between open and closed positions, the closed position being when the gate is in the channel. The assembly includes a first seat insert 104 and a second seat insert in first and second pockets of the valve body and on opposing sides of the gate from one another. A first seat 114 is between the first seat insert and the gate and a second seat is between the second seat insert and the gate. The assembly includes a static first seal (e.g., seal 111) between the valve body and the first seat insert and a static second seal between the valve body and the second seat insert. The assembly includes a first spring 122 directly contacting the first seat and the first seat insert and a second spring directly contacting the second seat and the second seat insert. In the assembly (a)(i) the first seat has a first proximal outer diameter (e.g., directly adjacent spring 122 and measured vertically in parallel to long axis of gate 101) and a first lip (e.g., directly adjacent gate 101) having a first distal outer diameter, (a)(ii) the first distal outer diameter is between the gate and the first proximal outer diameter, and (a)(iii) the first distal outer diameter is greater than the first proximal diameter. In the assembly (b)(i) the second seat has a second distal outer diameter and a second lip having a second proximal outer diameter, (b)(ii) the second proximal outer diameter is between the gate and the second distal outer diameter, and (b)(iii) the second proximal outer diameter is greater than the second distal diameter. In the assembly inner surfaces of each of the first and second seat inserts and each of the first and second seats each at least partially form the channel and are each configured to directly contact fluid when the fluid is traversing the channel. In the assembly the first spring is configured such that: (c)(i) the first spring biases the first seat against the gate when there is no fluid pressure in the proximal channel portion, (c)(ii) the first spring directly contacts the fluid when there is fluid pressure in the proximal channel portion, (c)(iii) the fluid forces the first seat against the gate when there is fluid pressure in the proximal channel portion, (c)(iv) the first spring biases the first seat insert towards the static first seal (e.g., seal 111) and against the valve body when there is no fluid pressure in the proximal channel portion, and (c)(v) the first spring compresses, when fluid pressure in the valve body exceeds fluid pressure in the proximal channel portion, to allow the first seat to move towards the first seat insert to lower the fluid pressure in the valve body. In the assembly the second spring is configured such that: (c)(i) the second spring biases the second seat against the gate when there is no fluid pressure in the distal channel portion, (c)(ii) the second spring directly contacts the fluid when there is fluid pressure in the distal channel portion, (c)(iii) the fluid forces the second seat against the gate when there is fluid pressure in the distal channel portion, (c)(iv) the second spring biases the second seat insert against the valve body when there is no fluid pressure in the distal channel portion, and (c)(v) the second spring compresses, when fluid pressure in the valve body exceeds fluid pressure in the distal channel portion, to allow the second seat to move towards the second seat insert to lower the fluid pressure in the valve body.

In the embodiment of FIG. 3 the assembly includes a first dynamic seal (e.g., seal 118) in a first slot between the first seat and the first seat insert and a second dynamic seal in a second slot between the second seat and the second seat insert.

In the embodiment of FIG. 3 the first and second springs are configured such that: the first spring biases the first seat against the gate when there is fluid pressure in the proximal channel portion; the first spring biases the first seat insert against the valve body when there is fluid pressure in the proximal channel portion; the second spring biases the second seat against the gate when there is fluid pressure in the distal channel portion; and the second spring biases the second seat insert against the valve body when there is fluid pressure in the distal channel portion.

In the embodiment of FIG. 3 the first seat includes a first sidewall (e.g., directly adjacent spring 122 and extending vertically) that couples to the inner surface (extending horizontally) of the first seat and the second seat includes a second sidewall that couples to the inner surface of the second seat. The fluid forces the first seat against the gate, when there is fluid pressure in the proximal channel portion, by directly contacting the first sidewall; and the fluid forces the second seat against the gate, when there is fluid pressure in the distal channel portion, by directly contacting the second sidewall.

While it is apparent that the invention disclosed herein is well calculated to fulfill the objects stated above, it will be appreciated that numerous modifications and embodiments may be devised by those skilled in the art.

What is claimed is:

1. A gate valve assembly comprising:
a valve body having a channel;
a gate movable between open and closed positions;
first and second seat inserts respectively fixedly coupled within first and second pockets of the valve body;
metal first and second seats respectively slidingly coupled to the first and second seat inserts;
a first spring between the first seat and the first seat insert and a second spring between the second seat and the second seat insert; and
a static first seal between the valve body and the first seat insert and a static second seal between the valve body and the second seat insert;
a ring including at least one aperture;
wherein inner surfaces of the first and second seat inserts and the first and second seats each at least partially form the channel and each directly contact fluid when the fluid is traversing the channel;
wherein: (i) the first spring biases the first seat towards the gate, (ii) the first spring directly contacts the fluid when the fluid is traversing the channel, and (iii) the first spring biases the first seat insert towards the valve body;
wherein the first seat is between the first seat insert and the gate and prevents the first seat insert from directly contacting the gate;
wherein (i) the first seat and the gate form a metal-to-metal seal when contacting one another; (ii) the metal-to-metal seal has a first point of contact between the gate and the first seat and a second point of contact between the gate and the first seat; (iii) the second point of contact is between the first point of contact and the channel; and (iv) between the first point of contact and the second point of contact, only metal materials of the gate and the first seat are in direct contact with each other;
wherein (i) a first axis intersects a wall of the valve body, the first seat insert, the first seat, and the gate when the gate is closed, (ii) the first axis is parallel to a long axis of the channel, (iii) the first axis intersects the static first seal, (iv) a second axis is orthogonal to the first axis and intersects the ring and the first spring.

2. The assembly of claim 1, wherein the static first seal includes metal and is fixed in place.

3. The assembly of claim 1 comprising a gap, wherein:
the first pocket includes threads;
the first seat insert is screwed into the threads of the first pocket;
the threads of the first pocket are not coterminous with the wall of the valve body;
the gap is between the threads of the first pocket, the wall of the valve body, the first seat insert, and an additional wall of the valve body;
a third axis intersects the wall of the valve body, the gap, and the threads of the first pocket; and
the first axis is parallel to the third axis;
the gap is sealed off from the channel.

4. The assembly of claim 1, wherein the first seat and the first seat insert are oriented with respect to each other such that the fluid forces the first seat against the gate when the gate is closed and there is fluid pressure adjacent the first seat.

5. The assembly of claim 1, wherein:
the static first seal directly contacts the wall of the valve body; and
the first spring surrounds the channel.

6. The assembly of claim 5, wherein:
the first seat includes a sidewall;
the first axis intersects the sidewall;
the first seat and the first seat insert are oriented with respect to each other such that, when the gate is closed and there is fluid pressure adjacent the first seat, the fluid directly contacts the sidewall and forces the first seat towards the gate.

7. The assembly of claim 6 comprising a dynamic seal at least partially between the first seat and the first seat insert, wherein the dynamic seal is not fixed in place.

8. The assembly of claim 1 comprising a dynamic seal at least partially between the first seat and the first seat insert, wherein the dynamic seal is not fixed in place.

9. The assembly of claim 1, wherein:
the first pocket includes threads;
the first seat insert is screwed into the threads of the first pocket.

10. The assembly of claim 1, wherein the first and second seat inserts are respectively fixedly coupled within the first and second pockets of the valve body via press fit.

11. A gate valve assembly comprising:
a valve body;
a gate coupled to the valve body and movable between open and closed positions;
a metal seat and a seat insert, wherein the seat is between the seat insert and the gate and the seat prevents the seat insert from directly contacting the gate;
a spring between the seat and the seat insert;
a ring including at least one aperture; and
a static seal between the valve body and the seat insert;
wherein the seat insert is statically, non-slidingly coupled to the valve body and the seat is slidingly coupled to the seat insert;
wherein inner surfaces of the seat insert and the seat at least partially form a channel and directly contact fluid when the fluid is traversing the channel;
wherein the spring biases the seat towards the gate;
wherein the seat and the gate form a metal-to-metal seal when contacting one another;
wherein a first axis: (i) intersects a wall of the valve body, the static seal, the seat insert, the seat, and the gate when the gate is closed, and (ii) is parallel to a long axis of the channel, the long axis extending through the channel without contacting either of the seat or the seat insert;
wherein a second axis is orthogonal to the first axis and intersects the ring and the spring.

12. The assembly of claim 11, wherein:
the seat includes a sidewall that intersects the first axis;
the spring is between the sidewall and the seat insert;
a contiguous path for the fluid extends from the channel to the sidewall.

13. The assembly of claim 12, wherein the seat and the seat insert are oriented with respect to each other such that the fluid will pressure the sidewall and force the seat against the gate when the gate is closed and there is fluid pressure adjacent the seat.

14. The assembly of claim 11, wherein the static seal includes metal and is fixed in place.

15. The assembly of claim 11, wherein the seat and the seat insert are oriented with respect to each other such that the fluid will force the seat against the gate when the gate is closed and there is fluid pressure adjacent the seat.

16. The assembly of claim 11, wherein:
the static seal directly contacts the wall of the valve body; and
the spring surrounds the channel.

17. The assembly of claim 11, wherein:
the seat includes a sidewall orthogonal to the inner surface of the seat;
the seat and the seat insert are oriented with respect to each other such that, when the gate is closed and there is fluid pressure adjacent the seat, the fluid directly contacts the sidewall and forces the seat towards the gate.

18. The assembly of claim 11 comprising a dynamic seal at least partially between the seat and the seat insert, wherein the dynamic seal is not fixed in place.

19. The assembly of claim 11, wherein:
a first of the seat and the seat insert includes a first void;
the ring is at least partially included in the first void.

20. The assembly of claim 19, wherein:
a second of the seat and the seat insert includes a second void;
the ring is at least partially included in the second void.

* * * * *